Patented Oct. 10, 1922.

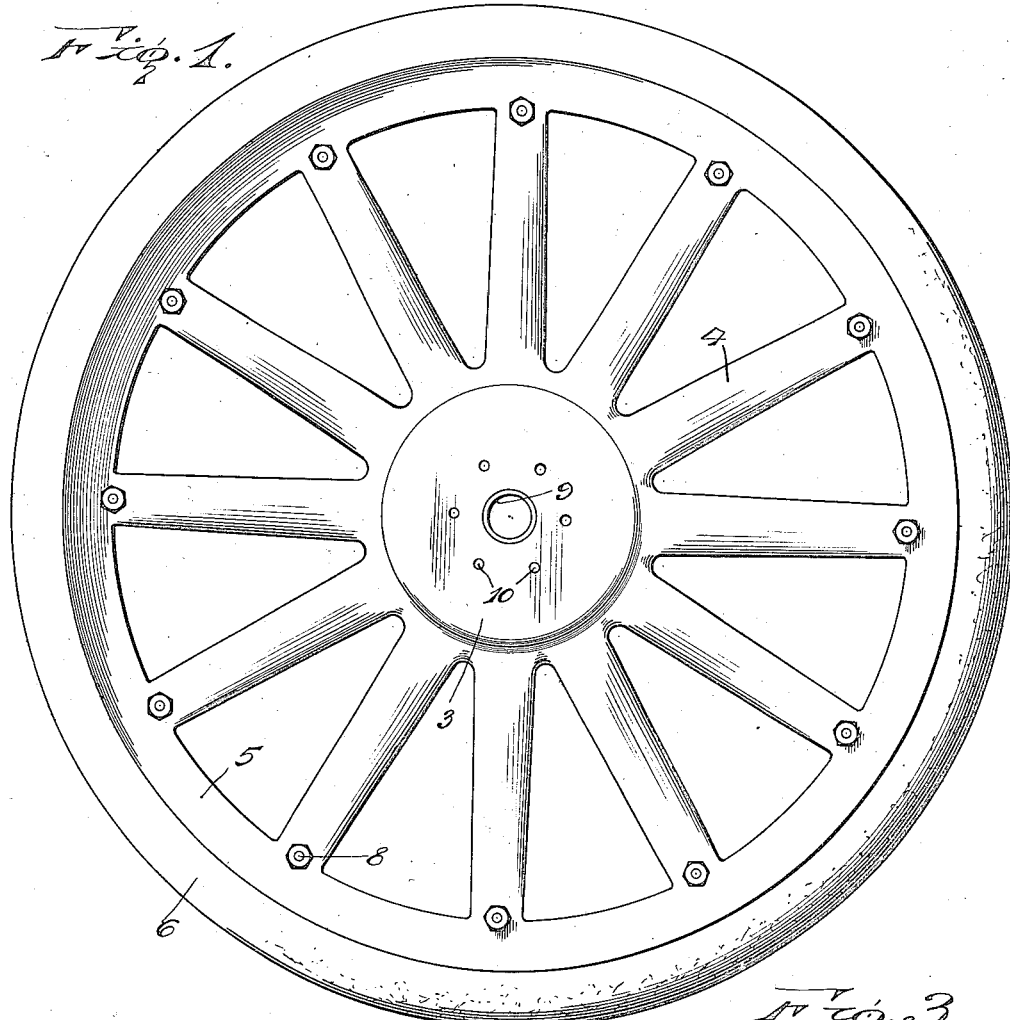
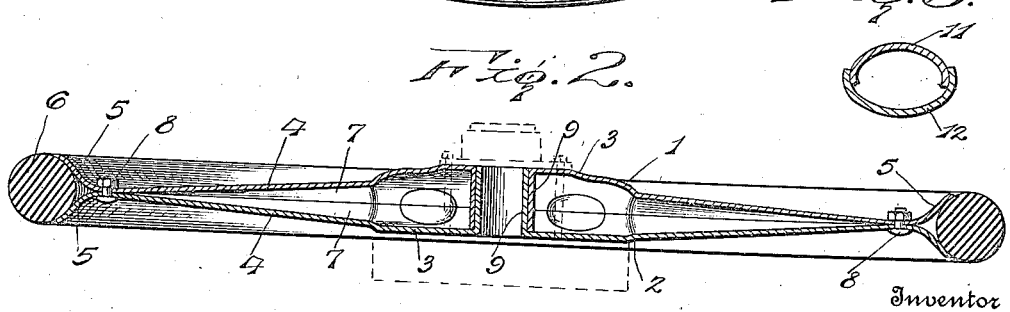

1,431,320

UNITED STATES PATENT OFFICE.

FREDERICK L. MINNICK, OF SPOKANE, WASHINGTON, ASSIGNOR TO TUBULAR STEEL AUTOMOBILE WHEEL MANUFACTURING COMPANY, OF SPOKANE, WASHINGTON, A CORPORATION OF WASHINGTON.

WHEEL.

Application filed September 22, 1921. Serial No. 502,443.

*To all whom it may concern:*

Be it known that I, FREDERICK L. MINNICK, a citizen of the United States, residing at Spokane, in the county of Spokane and State of Washington, have invented certain new and useful Improvements in Wheels, of which the following is a specification.

The object of this invention is to provide a vehicle wheel which may be very rapidly and cheaply produced and which, when in use, will be strong and durable. The invention is illustrated in the accompanying drawings and will be hereinafter fully set forth.

In the drawings—

Figure 1 is a side elevation of a wheel constructed in accordance with my invention;

Fig. 2 is a diametric section of the same;

Fig. 3 is a detail section showing another form of spoke.

My improved wheel is composed of two sheet metal shells 1 and 2 which may be readily stamped into the proper form at a single operation in a metal-stamping machine. Each shell includes a hub portion 3, a plurality of half spokes 4 projecting from the hub portion, and a circular rim or felly portion 5 integral with and connecting the outer ends of the spoke portions. The rim portions may be given any desired transverse configuration so that they may be employed in wheels of the clincher type or wheels of the demountable rim type and, when the two shells are assembled, the tire 6 will be engaged between and held by the rim portions, as will be readily understood on reference to Fig. 2. The spoke members 4 of each shell are dished, as shown at 7, so that, when two spoke portions are brought together in mating registration, they will produce a tubular spoke tapering or diminishing in its minor diameter toward its outer end, the mating spoke members or portions being secured together by bolts 8 at their outer ends, as clearly shown. The hub members 3 of the shells are integral disks connecting the inner ends of all of the spokes, and they are provided centrally with sleeves 9 extending from the respective disks across the plane of the spokes, as shown most clearly in Fig. 2. It will be readily noted that the inner diameter of one sleeve 9 is approximately the same as the external diameter of the other sleeve so that one may fit snugly within the other to produce a strong hub to receive the vehicle axle. Bolt holes 10 may be formed through the hub disks 3 to receive securing bolts by which the disks may be firmly held together and by which a dust cap or an axle cap nut may be secured in place as indicated by dotted lines in Fig. 2.

I prefer to employ bolts to secure the outer ends of the mating spoke members together as I am thereby enabled to readily separate the rim members when it is desired to apply a new tire. It is obvious, however, that rivets may be employed when it is desired to permanently unite the outer ends of the spoke members.

In the form of the invention shown in Figs. 1 and 2 the edges of the spoke members form a butt joint. In Fig. 3 I have shown a form in which a lap joint is formed by having the spoke member 11 narrower than the member 12 so that the edges of the former fit snugly between the edges of the latter thereby reenforcing the joint and effectually excluding dust.

It will be readily seen that I have provided a wheel which may be very expeditiously produced at a very low cost and which, when in use, will be very strong and durable. After the two shells are placed together as shown in Fig. 2, the abutting edges are joined by brazing, welding, or similar methods so that there will be no open seams to weaken the wheel.

Having thus described the invention, what is claimed as new is:

A tubular wheel consisting of two sheet metal shells each comprising a disk-like central hub member, a plurality of spoke portions of arcuate cross section formed integral with and radiating from the edges of the disk-like hub members, the arcuate spoke portions having their minor diameters decreasing towards their outer ends, rim portions formed integral with and uniting the outer ends of the spoke portions, the two shells being secured together at the outer ends of their spoke portions with the spoke portions registering and forming tubular structures, the walls of which converge toward their outer ends, coaxial cylindrical sleeves extending from the inner faces of the hub members and fitting snugly one within the other with the end of the encircling sleeve abutting the inner face of one hub member and the end of the encircled sleeve flush with the outer face of the other hub member, and fastening devices inserted through the hub members concentric with said sleeve.

In testimony whereof I affix my signature.

FREDERICK L. MINNICK. [L. S.]